United States Patent Office 2,915,326
Patented Dec. 1, 1959

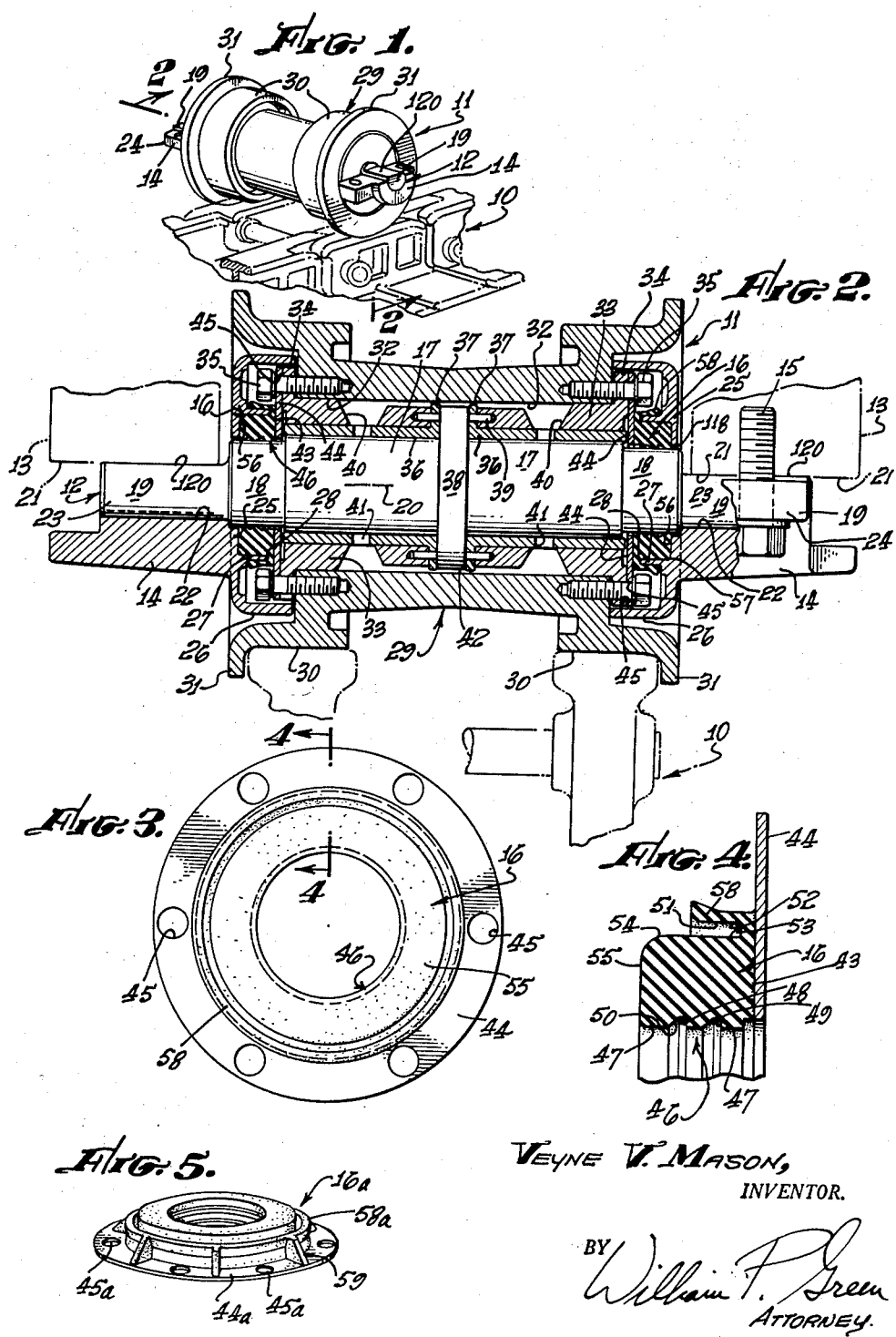

2,915,326

ROTARY SEAL STRUCTURE

Veyne V. Mason, Los Angeles, Calif.

Application September 25, 1958, Serial No. 763,375

8 Claims. (Cl. 286—5)

This invention relates to an improved type of fluid seal structure, for forming a fluid tight seal between two relatively rotatable parts. In certain respects, this seal structure is particularly well adapted for use in the roller assemblies which are employed in a tractor for movably mounting its endless flexible tracks.

In a conventional tractor, the drive track is normally mounted for its endless movement by means of a series of very heavy and strong rollers, which are rotatably mounted about individual usually stationary shafts attached to the swing frame of the tractor. One difficulty which has been encountered in the past in connection with these rollers has been the problem of assuring proper lubrication of the rollers at all times, to thus avoid excessive wear of either the roller structures or the mounting shafts under the very great forces which are encountered in use. Consequently, an object of the present invention is to provide a seal structure which is capable of very effectively and positively maintaining a body of lubricant within the interior of such a roller and mounting shaft assembly, to continually assure proper lubrication of the parts. As will appear, a seal embodying the invention is so positive in action as to eliminate the necessity for ever replenishing the lubricant within the roller and shaft assembly, except at the intervals at which the mechanical parts themselves are overhauled, repaired, or replaced. In the past, it has been necessary to lubricate these assemblies repeatedly and very often, and even with such repeated lubrication, the parts were not protected as well against wear as in the present arrangement in which the moving parts are permanently maintained in direct contact with a sealed body of liquid or semi-liquid.

In order to accomplish the above result, I utilize in the present device a unique essentially annular seal element or ring formed of an elastomeric material such as synthetic or natural rubber. This ring is disposed about the shaft of the apparatus, and is preferably rotatable relative thereto. The radially inner surface of the ring forms a seal surface adapted to engage the shaft in a relation forming a fluid tight seal between the two parts. In combination with this primary seal, there is provided at a location radially outwardly of the shaft an additional or secondary seal, which functions to protect the primary seal against wear by preventing access of dirt, dust or other contaminants to the primary seal. This secondary seal is formed by providing the elastomeric material of the ring an essentially annular recess extending axially into that material, and into which there projects an essentially annular element which engages the seal ring in a manner forming the secondary seal. This element which projects into the axially extending recess in the seal ring is desirably secured in fixed position relative to the shaft, and may be mounted to a flange structure extending radially outwardly from the shaft at one axial side of the seal ring. Also, the seal ring is preferably bonded integrally to and carried by a radially extending annular plate or ring, desirably formed of metal, and which ring may be bolted tightly to the end of the roller structure.

The above and other features and objects of the present invention will be better understood from the following detailed description of the typical embodiments illustrated in the accompanying drawing in which:

Fig. 1 is a fragmentary perspective view showing a portion of the endless flexible track of a tractor, and showing one of the roller assemblies which guide the track for its endless movement;

Fig. 2 is an enlarged axial section taken on line 2—2 of Fig. 1;

Fig. 3 is a further enlarged view showing only the seal ring unit of the roller assembly, and showing that unit as it appears when viewed from its outer end;

Fig. 4 is an enlarged fragmentary axial section taken on line 4—4 of Fig. 3; and Fig. 5 is a perspective view of a second form of seal ring constructed in accordance with the invention.

Referring first to Figs. 1 to 4, and particularly to Figs. 1 and 2, I have shown fragmentarily at 10 a portion of the lower ground engaging run of one of the endless flexible tracks of a conventional tractor. There is also shown in Figs. 1 and 2 one of the roller assemblies 11 which mounts the track 10 for its endless movement. This roller assembly 11 is rotatably mounted about a horizontal shaft 12, which is rigidly attached at its opposite ends to portions 13 of the swing frame of the tractor. The shaft ends are attached to these swing frame portions by a pair of end elements 14, which are secured to the frame by bolts 15. The seal rings with which the present invention is particularly concerned are represented in the figures at 16.

To describe first the specific structure of shaft 12, this shaft may have two main externally cylindrical portions 17, two short externally cylindrical smaller diameter portions 18 axially beyond main portions 17, and a central increased diameter annular flange portion 38 between the two portions 17. Axially outwardly beyond the two portions 18, shaft 12 has two end portions 19, having externally cylindrical surfaces extending about their undersides and centered about the same main axis 20 as are surfaces 17 and 18. At the upper sides of portions 19 of shaft 12, these portions are cut off in a common horizontal plane, to form upper horizontal surfaces 120, which are engageable with the correspondingly horizontal under surfaces 21 of frame portions 13 to effectively key shaft 12 against rotation. The two retaining members 14 have partial cylindrical recesses 22 of a shape corresponding to the outer partial cylindrical surfaces 23 of the end portions of the shaft, to closely confine and accurately locate the end portions of the shaft when bolts 15 are tightened upwardly through apertures in mounting ears 24 of parts 14 and into frame elements 13.

The two parts 14 form at their axially inner ends a pair of rigid radially extending flanges 25, disposed about shaft 12, and having annular axially projecting shield portions 26 at their peripheries. Each part 14 has a rather tight annular engagement with the end of one of the shaft surfaces 18, at a location 118, to prevent the access of dirt, dust and the like to rings 16 axially past these locations 118. At locations spaced radially inwardly from the peripheral portions 26 of flanges 25, each of the flanges carries a second axially extending annular projection 27, which may be defined at its inner and outer sides by surfaces which extend directly axially with respect to the main axis 20 of the shaft. At its axially inner end, each of the projections 27 may be rounded in cross-section, as seen at 28 in Fig. 2, to present a smooth rounded inner edge to ring 16.

With reference now to the roller assembly 11 which is mounted about shaft 12, this assembly includes a rigid metal annular roller proper 29, having outer cylindrical surfaces 30 for engaging track 10, and with annular flanges 31 being provided at opposite ends of the roller to locate the track. Roller 29 has an inner cylindrical surface 32, within the opposite ends of which there are received and retained a pair of annular rigid parts 33, having radially outwardly projecting flanges 34 which are secured tightly to roller 29 by bolts 35. Within parts 33, there are positioned a pair of sleeve type bearings or bushings 36, typically formed of bronze, babbitt, or any other suitable bearing material. These bushings 36 extend about portions 20 of shaft 12, to effectively mount the roller assembly for rotation about the shaft. Also, bearings 36 have inner end flanges 37 which are engageable against radially projecting flange 38 of shaft 12, to locate the roller assembly axially relative to the shaft. Keying elements 39 may be provided for extension through flanges 37 and into parts 33, to prevent rotation of bushings 36 relative to the rest of the roller assembly.

The parts 33 are externally and internally cylindrical except at the locations of a series of radially spaced axially extending lubricant passages 40, which communicate with lubricant apertures 41 in bushings 36, and all of which are in communication with the small annular space 42 about flanges 37 and 38. All of the passages 40, 41 and 42 are continually maintained completely filled with a suitable grease for lubricating the roller and shaft.

Seal rings 16 are provided for preventing the leakage of any of the lubricant from within the interior of the roller assembly. These rings are desirably formed of a resiliently deformable elastomeric material, selected to be capable of withstanding without damage the grease which is utilized as a lubricant in the device. For example, this material may be a suitable synthetic or partially synthetic rubber, typically neoprene. Normally, it is preferred that the elastomer have a shore hardness between about 58 and 68 on the D scale, desirably about 63.

At its axially inner side, each of the elastomeric seal rings 16 has a directly radially extending annular surface 43, which is continuously and annularly vulcanized to a rigid radially extending metal plate 44. At a location outwardly beyond ring 16, this plate 44 contains a series of circularly spaced apertures 45, through which bolts 35 project, with the heads of these bolts bearing against the axially outer side of plate 44 to tightly secure the plate to parts 29 and 33. Plate 44 is desirably defined at its opposite sides by two parallel surfaces extending directly radially with respect to axis 20.

The radially inner surface of each of the elastomeric seal rings 16 is so shaped as to form a very effective annular fluid tight seal with the engaged outer surface 18 of shaft 12. For this purpose, the inner surface 46 of ring 16 may be shaped to present a series of axially spaced annular internally cylindrical seal surfaces 47, each engageable with surface 18 of the shaft. Between these surfaces 47 of the seal ring, there are formed in the ring a plurality of annular grooves 48. Each of these grooves may be defined at its axially inner side by a directly radial surface 49, and at its axially outer side by a frusto-conical surface 50 which tapers progressively and at an angle toward surface 18, as surface 50 advances axially.

At its axially outer side, each of the elastomeric rings 16 contains an annular groove or recess 51 extending axially into the material of the ring. This groove 51 is so located and shaped as to receive projection 27 of part 14 in a mating sealing relation. The part 14 and its projection 27 are desirably formed of a rigid material, such as a rigid steel or other metal. To define recess 51 somewhat more specifically, this recess has inner and outer walls 52 which extend directly axially with respect to main axis 20, and are both cylindrical to engage the cylindrical inner and outer surfaces of projection 27. At its inner end, recess 51 may be of rounded cross-sectional configuration (see Fig. 4) corresponding to the rounded configuration of the end portion 28 of projection 27, to engage the projection at that end location as well as along the inner and outer sides thereof. For best results, it is preferred that the normal radial extent of groove 51 (that is, the radial dimension in the condition to which the ring 16 normally tends to return by its own resilience) is slightly less than the radial thickness of the mating projection 27, with the projection being so located that when it is forced into the slightly undersize groove 51, both the radially inner and outer surfaces of projection 27 will tightly engage the walls of groove 51 in fluid tight sealing relation. Axially outwardly beyond groove 51, the inner one of the two surfaces 52 may continue at 54 for a short distance, and then may curve radially inwardly to form a directly radial annular surface 55 which is annularly engageable with an annular surface 56 formed within part 14 at a location radially inwardly of projection 27. The rounded curvature of elements 14 and 16 at the location 57 at which surfaces 52 and 55 merge is the same for both of the elements 14 and 16, so that even at this point the seal ring 16 engages and forms a seal with part 14. Radially outwardly of groove 51, the material of ring 16 forms a lip 58, having a small radial extent compared with the radial thickness of the inner portion of ring 16.

Fig. 5 shows a slightly variational form of seal ring 16a constructed in accordance with the invention. This ring 16a may be considered to be identical with ring 16 of Figs. 1 to 4, except that the ring 16a has a series of evenly circularly spaced portions 59, which project radially outwardly to form ribs or reinforcing elements circularly between the bolt passing apertures 45a, with these ribs 59 being bonded to the material of carrier plate 44a to reinforce the outer thin annular lip 58a (corresponding to lip 58 of Fig. 4) against excessive radially outward deflection.

When a roller assembly utilizing either of the two disclosed forms of seal ring is in use, the rings 16 or 16a turn with roller 29 relative to shaft 12. The inner surfaces 47 of the rotating seal rings engage the outer stationary surfaces 18 of shaft 12 in a manner forming fluid tight seals at opposite ends of the roller, effectively preventing the leakage of any grease or other lubricant axially outwardly past the seal rings. Also, the permanency of this seal is assured by reason of the protection which is afforded to seal 47—18 by the secondary seal which is formed by the engagement of projection 27 and surfaces 56 and 57 with ring 16 or 16a. More particularly, this secondary seal prevents the passage of any dirt, dust or the like radially inwardly past ring 16 or 16a to the location of seal surfaces 47, so that those surfaces 47 and the engaged surfaces 18 are always maintained completely clean, and so that the wear on these surfaces is therefore kept to an absolute minimum.

In addition to the above discussed advantages of the present seal structure, this arrangement also has another very decided advantage in instances in which the tractor roller assemblies and tracks are actually submerged or partially submerged in water during use. Specifically, in such cases, the water which is received about lip 58 tends to urge that lip tightly radially inwardly against metal projection 27, and to thereby further increase the effectiveness of the seal formed between those parts.

I claim:

1. Apparatus comprising first and second sections one of which is rotatable about an axis relative to the other, the first of said sections including a shaft having an outer annular seal surface and including means forming an essentially annular projection extending essentially axially at a location radially outwardly of said shaft, said second section including an elastomeric seal ring disposed about said shaft, said seal ring having a radially inner seal surface engageable in sealing relation with said outer surface of the shaft to prevent axial fluid flow therepast, and said ring containing an essentially annular recess extending essentially axially into the material of the ring and into which said projection of the first section extends in contact with the ring.

2. Apparatus as recited in claim 1, in which said second section includes a rigid carrier member extending about the shaft adjacent the seal ring, said ring being bonded tightly to said carrier member at a side opposite the side at which said recess in the seal ring is formed.

3. Apparatus as recited in claim 1, in which said radially inner surface of the seal ring forms a plurality of axially spaced essentially annular seal ridges engageable with the shaft, said ring being essentially annularly recessed between said ridges.

4. Apparatus as recited in claim 1, in which said seal ring forms an axially projecting essentially annular lip radially outwardly of said recess and defining the outer side of the recess and having a radial thickness which is small as compared with the radial thickness of the seal ring between said shaft and said recess.

5. Apparatus as recited in claim 1, in which said seal ring forms an axially projecting essentially annular lip radially outwardly of said recess and defining the outer side of the recess and having a radial thickness which is small as compared with the radial thickness of the seal ring between said shaft and said recess, said lip having an axial extent shorter than the portion of the seal ring which is located radially inwardly of said recess.

6. Apparatus as recited in claim 1, in which said projection engages said seal ring within said recess at both the radially inner and radially outer sides of the projection.

7. Apparatus comprising a shaft having an outer seal surface, means forming a flange fixed relative to said shaft and projecting radially outwardly therefrom near said seal surface, an essentially annular rigid projection carried by and extending axially from said flange at a location spaced radially outwardly from said seal surface, a roller structure rotatably disposed about said shaft and including a rigid metal carrier ring at an end of the roller structure located axially opposite said flange, and a seal ring formed of elastomeric material disposed about said shaft between said flange and said carrier ring and bonded essentially annularly to the latter to turn with the roller structure, said seal ring having a radially inner seal surface engageable in sealing relation with said shaft surface to prevent axial fluid flow therepast, and said seal ring containing an essentially annular recess extending essentially axially into the material of the seal ring and into which said projection of the first section extends in essentially annular sealing contact with the seal ring.

8. Apparatus as recited in claim 7, in which said seal ring forms an axially projecting essentially annular lip radially outwardly of said recess and defining the outer side of the recess and having a radial thickness which is small as compared with the radial thickness of the seal ring between said shaft and said recess, said lip having an axial extent shorter than the portion of the seal ring which is located radially inwardly of said recess, said radially inner surface of the seal ring forming a plurality of axially spaced essentially annular seal ridges engageable with the shaft, said seal ring being essentially annularly recessed between said ridges.

References Cited in the file of this patent
UNITED STATES PATENTS

| | | |
|---|---|---|
| 2,014,859 | Mitchell | Sept. 17, 1935 |
| 2,666,674 | Deffenbaugh | Jan. 19, 1954 |